(12) United States Patent
Sanders (10) Patent No.: US 8,194,676 B2
(45) Date of Patent: Jun. 5, 2012

(54) STREAMING SEGMENTATION AND REASSEMBLY IN ASYNCHRONOUS TRANSFER MODE COMMUNICATIONS

(75) Inventor: Mark Sanders, Roanoke, VA (US)

(73) Assignee: Force10 Networks, Inc., San Jose, CA (US)

(*) Notice: Subject to any disclaimer, the term of this patent is extended or adjusted under 35 U.S.C. 154(b) by 262 days.

(21) Appl. No.: 12/643,145

(22) Filed: Dec. 21, 2009

(65) Prior Publication Data

US 2011/0149975 A1    Jun. 23, 2011

(51) Int. Cl.
*H04L 12/28* (2006.01)
*H04L 12/56* (2006.01)
*H04J 3/24* (2006.01)

(52) U.S. Cl. .................................. 370/395.1; 370/474

(58) Field of Classification Search ............... 370/395.1, 370/474
See application file for complete search history.

(56) References Cited

U.S. PATENT DOCUMENTS

| 5,991,308 | A | * | 11/1999 | Fuhrmann et al. | 370/395.53 |
| 2004/0228346 | A1 | * | 11/2004 | Parruck et al. | 370/395.1 |
| 2006/0153241 | A1 | * | 7/2006 | Czerwiec et al. | 370/493 |
| 2008/0130659 | A1 | * | 6/2008 | Polland | 370/395.52 |
| 2009/0147864 | A1 | * | 6/2009 | Lida et al. | 375/257 |
| 2009/0296587 | A1 | * | 12/2009 | Hsiao | 370/242 |

* cited by examiner

*Primary Examiner* — Ronald Abelson
(74) *Attorney, Agent, or Firm* — Haynes and Boone, LLP (57) ABSTRACT

Systems, methods, and apparatuses are provided that enable streaming of ATM cells between a transmit/receive data processing application and a transmission convergence function. Data to be segmented into an ATM cell is received at a SAR engine, and provided to a transmission convergence function, with the first cells transmitted to the transmission convergence function before the SAR function receives an end-of-packet indication from the optimization engine. Data received at a transmission convergence function is placed in a received packet queue at the SAR function, with packets provided to an application after a start-of-packet indication is received, and before an end-of-packet indication is received, at the SAR function.

20 Claims, 8 Drawing Sheets

PRIOR ART

STREAMING SEGMENTATION AND REASSEMBLY IN ASYNCHRONOUS TRANSFER MODE COMMUNICATIONS

FIELD OF THE INVENTION

The present invention relates to data communication systems and, more particularly, to a system that allows reduction in delays associated with segmentation and reassembly of data over an asynchronous transfer mode communication link.

BACKGROUND OF THE INVENTION

Figure 1:
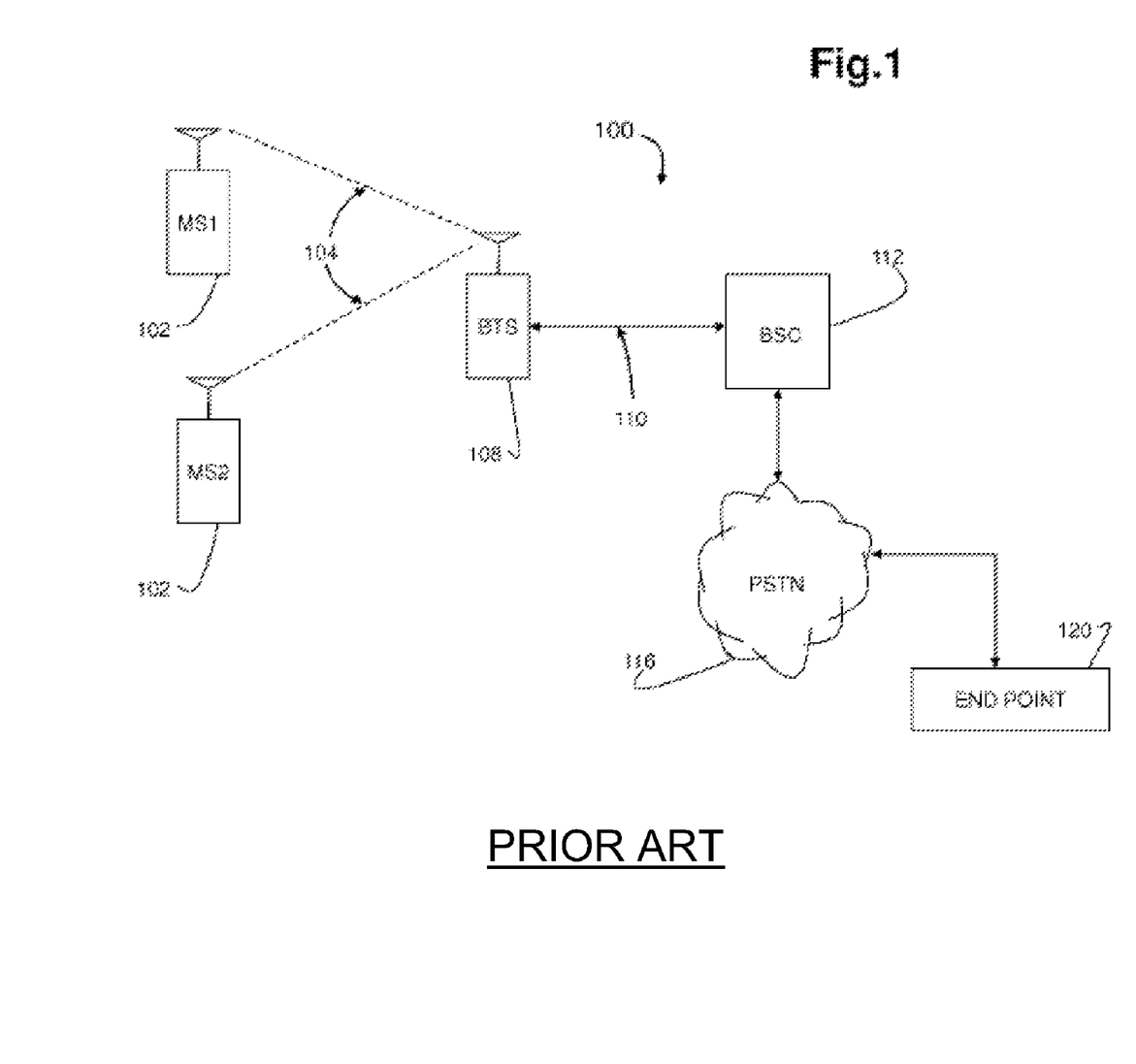
FIG. 1 is a functional block diagram illustrating a communications network including typical components of such a network.

Communication networks, and particularly wireless communication networks, operate by sending information between base transceiver stations ("BTS") and base station controllers ("BSC"). FIG. 1 is an illustration of a wireless communication network 100. The wireless communication network 100, in this particular illustration, relates to cellular telephone or mobile stations 102, but it will be understood that other types of data communication devices could be substituted for mobile stations 102. The mobile stations 102 establish wireless communications links 104 to the BTS 106. Conventionally, BTS 108 is connected to BSC 112 using wired communication links 110, such as, for example, T-1 lines, T-3 lines, E line equivalents, or the like.

In operation, mobile stations 102 transmit information to BTS 108 over the wireless communications link. BTS 109 packages the received information from the mobile stations into packets pursuant to a transmission protocol, and transmits each packet to BSC 112 using conventional protocols. Commonly, BTS 108 organizes the information into a frame of information that is transmitted over a communications link which can run asynchronous transfer mode. When ATM communications links are used for transmission, the BTS 108 and BSC 112 will support ATM protocol or an interworking gateway will be used to provide the translation of the packets into the ATM communications link. Prior to transmitting the information over the ATM communications link, it is organized into one or more cells. Thus, for each packet from a mobile station 102, there may be one or more corresponding cells. The cells are transmitted with a plurality of other information to BSC 112 over the ATM communications link. The BSC 112 extracts the frames of information from the ATM communications link and distributes it as required to local or remote end points (not specifically shown, but generally known in the art).

When transmitting information over an ATM communications link, it is necessary to convert the frames of information into packets that may be then sent across the ATM communications link. Segmenting the packets into cells of information for transmission across an ATM network, and the reception of the cells from an ATM network, is well known and is referred to as segmentation and reassembly (SAR) of ATM data. Commonly, ATM network components have what's referred to as ATM adaptation layers which perform segmentation and reassembly functions. There are a number of different types of ATM adaptation layers and such ATM adaptation layers are well known in the art. Several ATM adaptation layer protocols have been defined by the international telecommunications union, including ATM adaptation layer protocol (AAL) types 1-5, which are classified based on whether any particular timing relationship must be maintained between source and destination locations, whether applications require a constant bit rate and whether the transfer is connection oriented or connectionless. ATM adaptation layer 5 (AAL5) is commonly used to send variable link packets up to 65,535 octets in size across an ATM network. AAL5 is one adaption type that is commonly used to transmit data between BTS 108 and BSC 112.

When an application sends information over an ATM connection using AAL5, the sending function typically delivers an entire block or packet of information to an AAL5 interface. The AAL5 interface generally appends an 8 octet trailer to the block or packet information, divides the provided information into a number of different pieces, each piece having 48 octets of data. The AAL5 interface then transfers each of the 48 octet pieces across the ATM network in a single ATM cell. On the receiving end of the connection, the AAL5 interface reassembles the incoming cells into a packet, checks for errors in the packet and provides the resulting block of information to other functions on the receiving end of the ATM network. The process of dividing a block of information into cells, and regrouping them into a packet, is known as ATM segmentation and reassembly (SAR). An AAL5 interface, as can be seen, must receive the information, segment the information, and generate the appropriate error checking information to be sent along with the information in the ATM cells. In some cases, the AAL5 interface must wait for a significant period of time to receive all of the information that is to be transferred over the ATM network. Accordingly, it would be beneficial in many cases to reduce the amount of delay between when the information is first received at the AAL5 interface and when the information may be sent.

SUMMARY OF THE INVENTION

Embodiments disclosed herein address the above stated needs by providing systems, methods, and apparatuses that enable streaming of ATM cells between an application and a transmission convergence function. A packet of information to be segmented into an ATM cell is received at a segmentation and reassembly engine, and provided to a transmission convergence function, with the first cells transmitted to the transmission convergence function before the segmentation and reassembly engine receives an end-of-packet indication (the full packet) from the application. Data received at a transmission convergence function is placed in a received packet queue at the segmentation and reassembly function, with packets provided to an application after a start-of-packet indication is received, and before an end-of-packet indication is received, at the segmentation and reassembly function.

In one aspect, the present disclosure provides a method for transmitting data or information over an asynchronous transfer mode network. The method of this aspect comprises the steps of (a) receiving data at a segmentation and reassembly (SAR) application, the data received as part of a data stream having a start-of-data flag indicating the start of the data stream and an end-of-data flag indicating the end of the data stream, (b) placing information from the data stream into a plurality of ATM cells, (c) transmitting the ATM cells, the first ATM cell transmitted from the SAR application before the end-of-data flag is received at the SAR application, and (d) when the end-of-packet flag is received, setting PTI type bits in a final ATM cell header and appending a trailer to the final ATM cell. The transmitting of the ATM cells may include transmitting the cells to a transmission convergence function. The steps of the application, the segmentation and reassembly, and the transmission convergence may be performed by an FPGA that is included as part of an ATM endpoint.

In another aspect, the present disclosure provides a method for receiving data from an asynchronous transfer mode network. The method of this aspect comprises the steps of (a)

receiving data at a transmission convergence application, the data received as an asynchronous transfer mode (ATM) cell, (b) placing the received cells into a receive cell queue, (c) when the received cell is the first cell of a sequence, providing an indication of a start-of-packet to an application, (d) transmitting the cell payload data to the application, and (e) when the transmission convergence application receives an indication that the final cell of the ATM cells is received, providing an end-of-packet indication to the application and validating the 8-byte trailer. The method of this aspect may further include (f) receiving packets from the received packet queue at a segmentation and reassembly application, and (g) assembling a plurality of the cells from the received packet queue into a packet cell stream to be provided to the application. The transmission convergence, segmentation and reassembly, and application steps may be performed by an FPGA that is included as part of an ATM endpoint.

DETAILED DESCRIPTION

Various exemplary embodiments of the present invention will be described with reference to drawing FIGS. 2-6. While the embodiments described relate to mobile communication systems, one of ordinary skill in the art will recognize on reading the disclosure that the present invention may be used in other data transmission systems that could gain advantages of data streaming.

Figure 2:
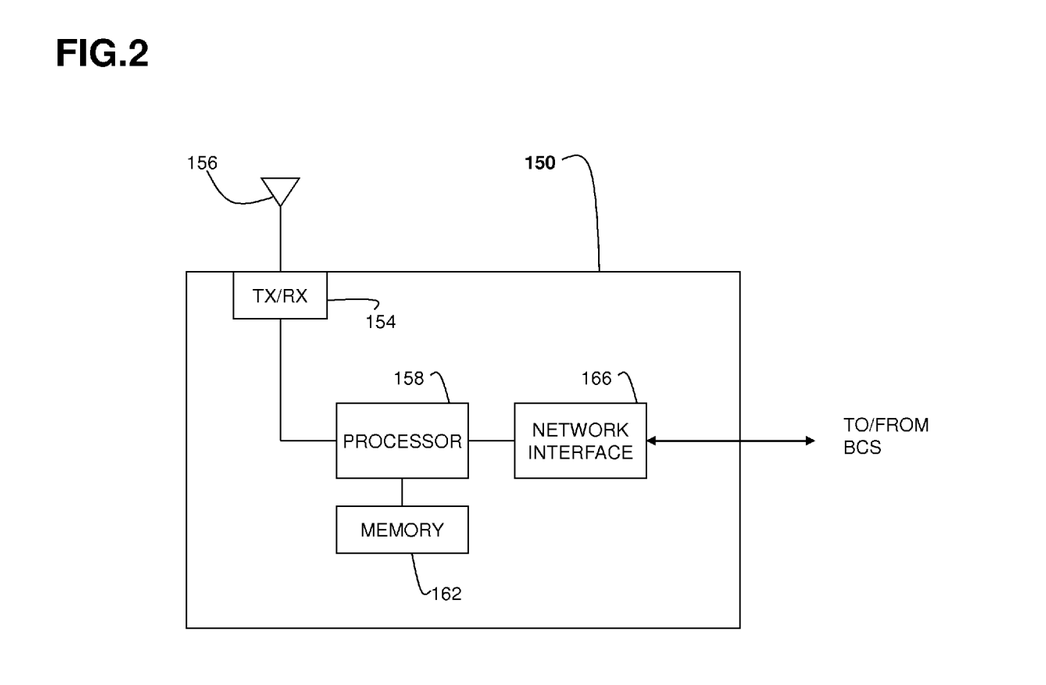
FIG. 2 is a functional block diagram of a base transceiver station for an exemplary embodiment of the present disclosure.

Referring now to FIG. 2, a functional block diagram of a base transceiver station (BTS) 150 of an embodiment is described. In this embodiment, the BTS 150 includes a transmit/receive unit 154 that is interconnected to an antenna module 156, and is operable to send/receive wireless communication signals to/from one or more mobile units through the antenna module 156. The transmit/receive unit 154 includes components typical of such units, including components to modulate/demodulate communication signals on carrier signals, etc. Such transmit/receive units 154 are well known in the art and will not be described in further detail. The antenna module 156 is also well known in the art, and may include one or more antennas and any other components necessary to send/receive wireless signals. The BTS 150 includes a processor module 158 that is operable to perform any processing required by the BTS 150. The processor module 158 may include one or more processing units, such as microprocessors, ASICs, DSPs, FPGAs, etc., that control the operations of the BTS 150. Interconnected to the processor module 158 is a memory 162 that may be used to store programs and other information necessary and convenient for the operations of the processor module 158. Such a memory 162 may include one or more memory components that may include volatile and/or non-volatile memory components such as RAM, hard disk drive(s), optical data storage, etc. The BTS 150 includes a network interface 166 that is operable to provide communications to/from one or more base station controllers (BSC) over an appropriate communication link, such as, for example, a T1 line, a T3 line, the E line equivalents, or the like. The network interface 166 in an exemplary embodiment, communicates with one or more BTSs using asynchronous transfer mode communications. As is understood in the art, asynchronous transfer mode communications are accomplished using a network that relays cells of information (data, management/control, etc.) using a data link layer protocol. The data link layer protocol encodes data traffic into fixed-size cells that are then transmitted between ATM endpoints. Such fixed-size cells contain a total of 53 bytes, 48 bytes of data (also referred to as "payload") and 5 bytes of header information. In order to support non-ATM information transfer protocols, ATM Adaptation Layer (AAL) protocols have been developed that support such non-ATM transfer protocols, such as, for example, Gigabit Ethernet, Internet Protocol (including VOIP), Frame Relay, SONET/SDH, and UTMS and/or other wireless protocols. As is also understood, a number of AALs have been defined by ITU-T, and include AAL Type 1 (AAL1) through AAL Type 5 (AAL5). The AALs provide segmentation and reassembly (SAR), handling of transmission errors, handling of lost and misinserted cell conditions, and timing and flow control. In one embodiment, the network interface 166 operates to transmit/receive information to/from the BSC using AAL5 by implementing a streaming SAR function in the AAL that provides for decreased latency when transmitting cells using AAL5. Such streaming segmentation and reassembly will be described in more detail below.

Figure 3:
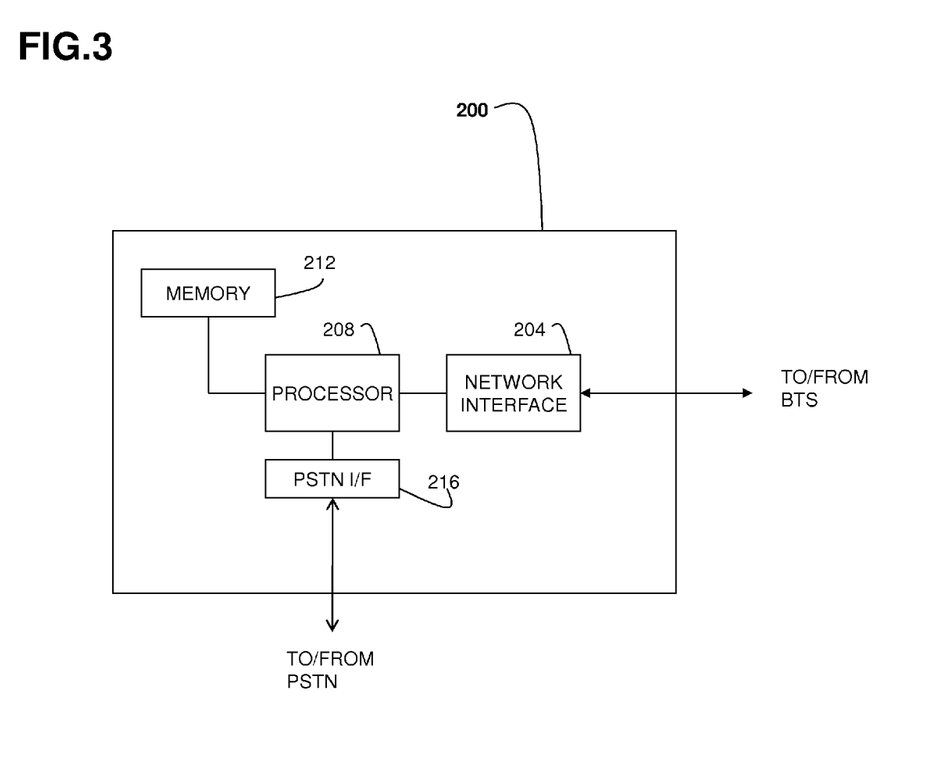
FIG. 3 is a functional block diagram of a base station controller for an exemplary embodiment.

With reference now to FIG. 3, a functional block diagram of a BSC 200 of an exemplary embodiment is described. In the embodiment of FIG. 3, the BSC 200 includes a network interface 204 that performs similar functions as described with respect to network interface 166 of FIG. 2, and which will not be described in further detail with respect to this drawing figure. The network interface module 204 is interconnected with a processor module 208 that performs processing functions. A memory module 212 is interconnected with the processor module 208, and stores applications and/or data that are necessary and/or convenient for the operation of the BSC 200. In the embodiment, of FIG. 3, the processor is also interconnected with a Public Switched Telephone Network (PSTN) interface 216 that provides an interface to the PSTN. While a PSTN interface 216 is illustrated in FIG. 3, it will be understood that such a BSC 200 may include other types of, or additional, interfaces that may provide communications over other types of networks other than the PSTN.

Figure 4:
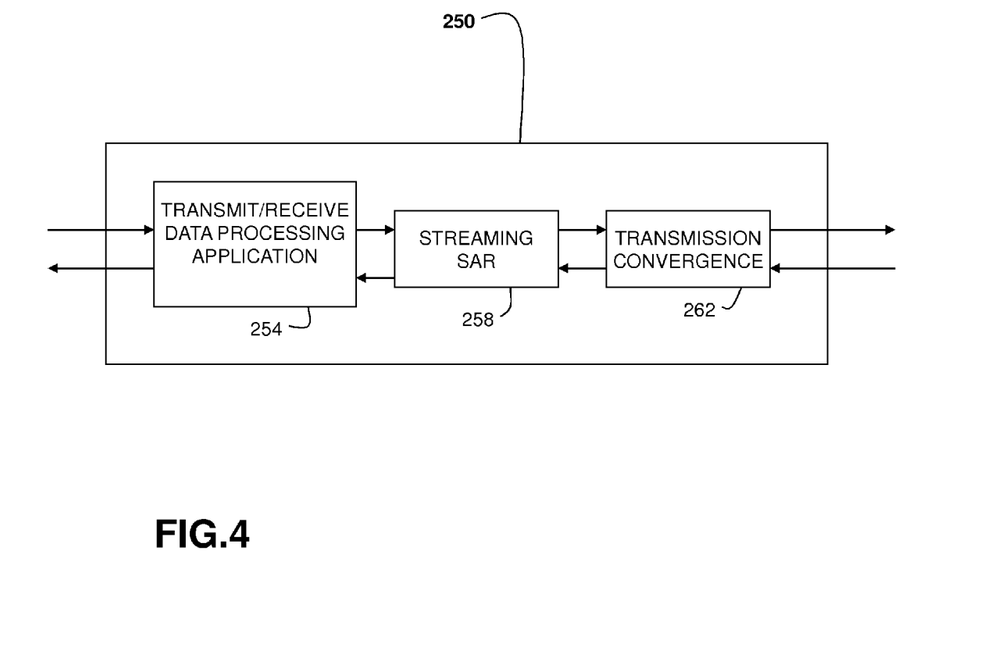
FIG. 4 is a functional block diagram of a portion of an ATM endpoint for an exemplary embodiment.

With reference now to FIG. 4, a block diagram of a portion of an ATM endpoint 250 is described. The elements illustrated in FIG. 4 may be part of a network interface, such as 166 or 204 of FIGS. 2 and 3, respectively. In one embodiment, the elements of FIG. 4 are incorporated into a field programmable gate array (FPGA), although it will be understood that such elements may be implemented in any number of ways, including software, hardware such as state machines, or combinations thereof. In the embodiment of FIG. 4, data is transmitted over the ATM network as application data that is processed at a transmit/receive data processing application 254. The application 254 performs functions to prepare data for transmission across an ATM network. This preparation may include optimization of the data information, encoding and decoding of information such as video streams, etc. The application 254 is interconnected to a streaming SAR engine 258. As will be described in more detail below, the streaming SAR engine 258 transmits and receives data over an ATM network that is transmitted according to AAL5 protocol, and reduces delay associated with receiving a complete frame of data before transmitting segments of the frame to a transmission convergence (TC) function 262. Similarly, the streaming SAR engine 258 is adapted to receive streaming data from the TC function 262, and transmit received data to the application 254 in a streaming fashion. The TC function 262 performs traditional transmission convergence functions, as is understood in the art that transmit and receive data over the physical media of the ATM network.

Figure 5A:
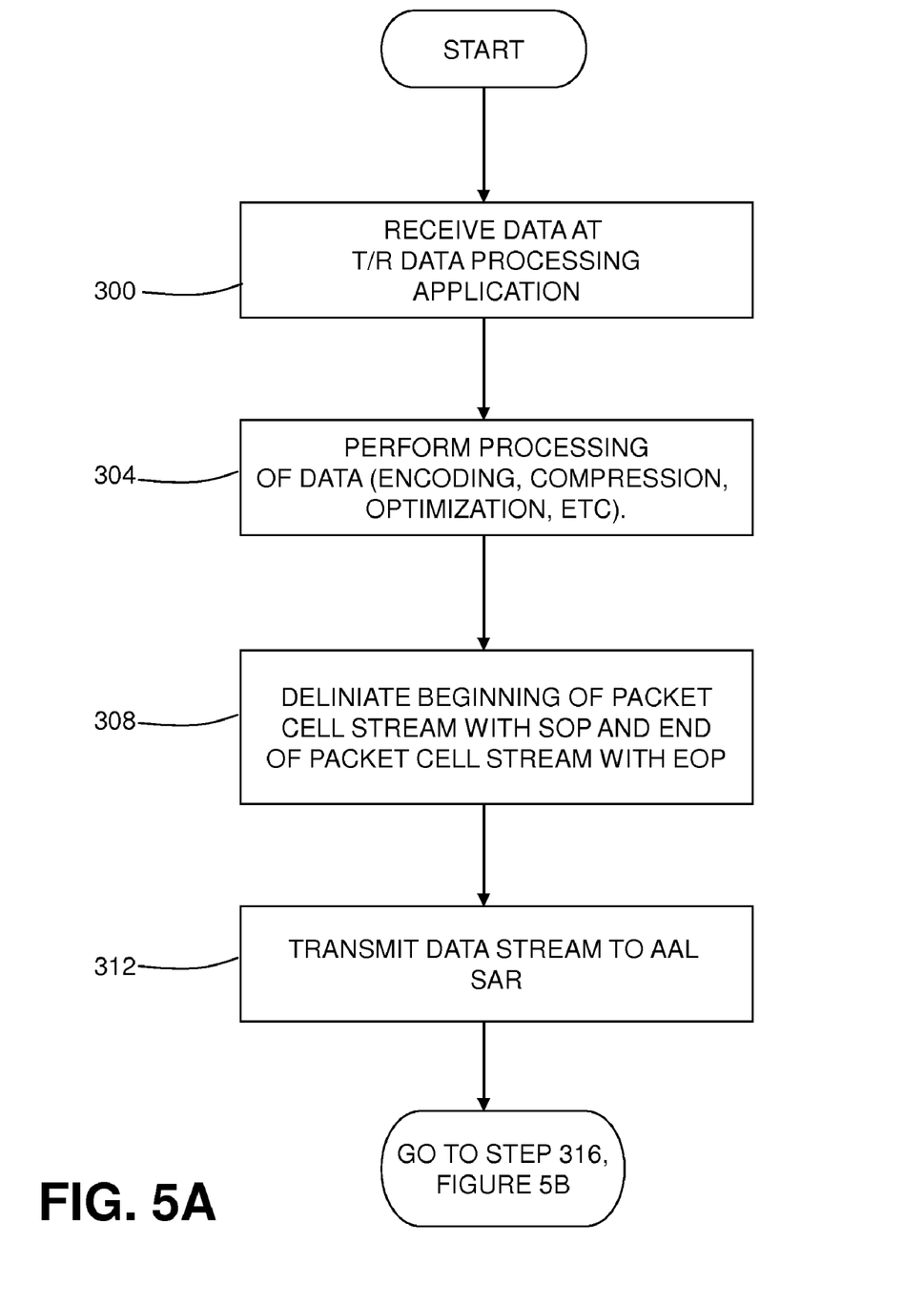
FIG. 5 is flow chart diagram illustrating the operational steps for an upstream flow path from an optimization engine to an ATM transmission convergence function.
Figure 5B:
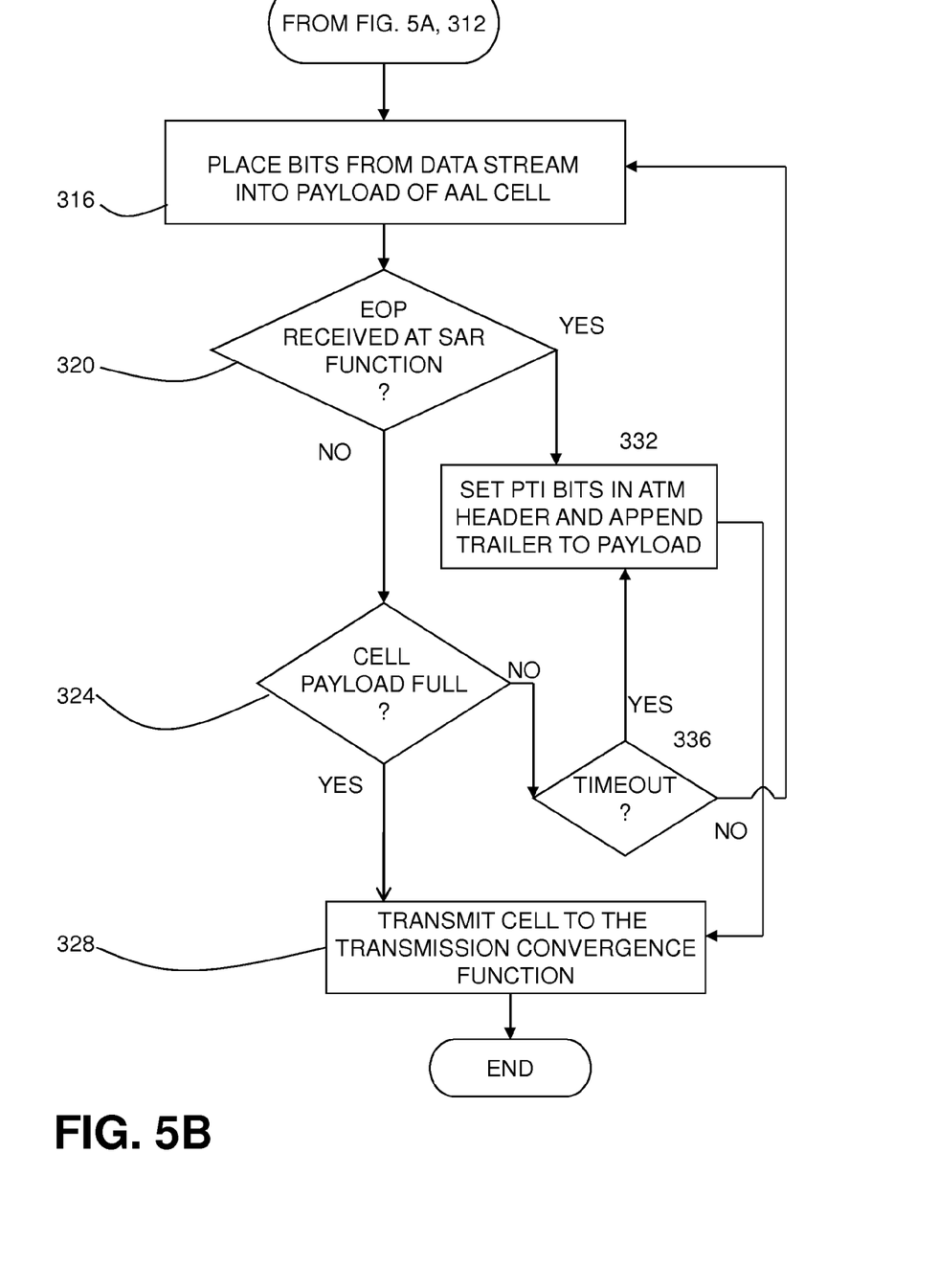

As mentioned above, the streaming SAR function 258 streams data between the application and transmission convergence function rather than waiting for a complete frame of data to be received. With reference now to FIG. 5, a flow chart diagram illustrating the operational steps for an upstream flow path where data is provided to the streaming SAR and to the TC function. The embodiment described with respect to FIG. 5 corresponds to the elements of FIG. 4, namely, an application, streaming SAR function, and a TC function. It will be understood that data may be provided to a streaming SAR function by any of a number of applications such as video codecs (MPEG2, MPEG4), data optimization functions, etc. Initially, as indicated at block 300, data is received at an application. In an embodiment, the application performs data optimization at a BSC or a BTS to prepare data for transmission across an ATM network. At block 304, the application performs processing on the data such as video encoding or data compression/optimization. The application delineates a beginning of a packet cell stream with a start of packet (SOP) indicator and the end of a packet cell stream with an end of packet (EOP) indicator, as indicated at block 308. The data stream is transmitted, at block 312, to the ATM adaptation layer (AAL) segmentation and reassembly (SAR) function, according to block 312. In this embodiment, the data is transmitted from the application to the SAR function in a streaming fashion as the application produces a data stream. At block 316, the data bits from the data stream are placed into the payload of an AAL cell.

At block 320, it is determined if an End Of Packet (EOP) indicator is received at the SAR function. The EOP indicator is provided from the application and indicates the end of the packet cell stream from the application. If the EOP indicator is not received, it is determined if the payload of the ATM cell is full, as indicated at block 324. If the ATM cell is full, the SAR function delivers the cell to the transmission convergence function, according to block 328. If, at block 320, it is determined that the EOP is received, the SAR function sets payload type indicator (PTI) bits in the ATM header and appends the trailer to the cell payload. The SAR function then delivers the cell to the transmission convergence function at block 328. If, at block 324, it is determined that the cell payload is not full, the SAR function waits for additional bits from the optimization engine to be added to the cell payload. If the SAR function does not receive any bits from the application for a predetermined timeout period, as indicated at block 336, the SAR function performs the operations as described with respect to block 332. If additional bits are received from the application before the expiration of the timeout period the SAR function performs the operations as described with respect to block 316. In this manner, the SAR function streams AAL cells to the transmission convergence function before all of the bits from the packet cell stream are received from the optimization engine. Thus, data from the application may be transmitted from the transmission convergence function with reduced latency thereby enhancing the efficiency of the ATM network.

Figure 6A:
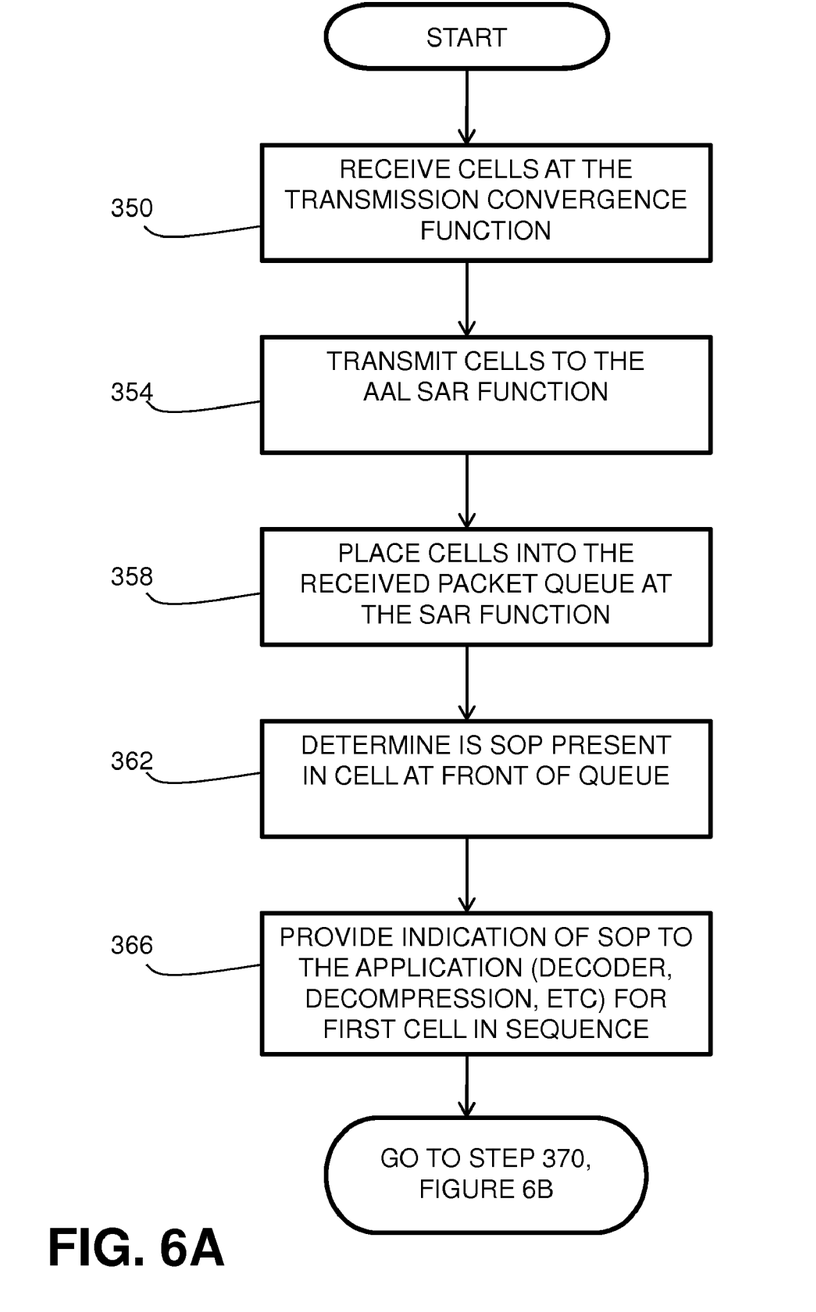
FIG. 6 is flow chart diagram illustrating the operational steps for a downstream flow path from an ATM transmission convergence function to an optimization engine.
Figure 6B:
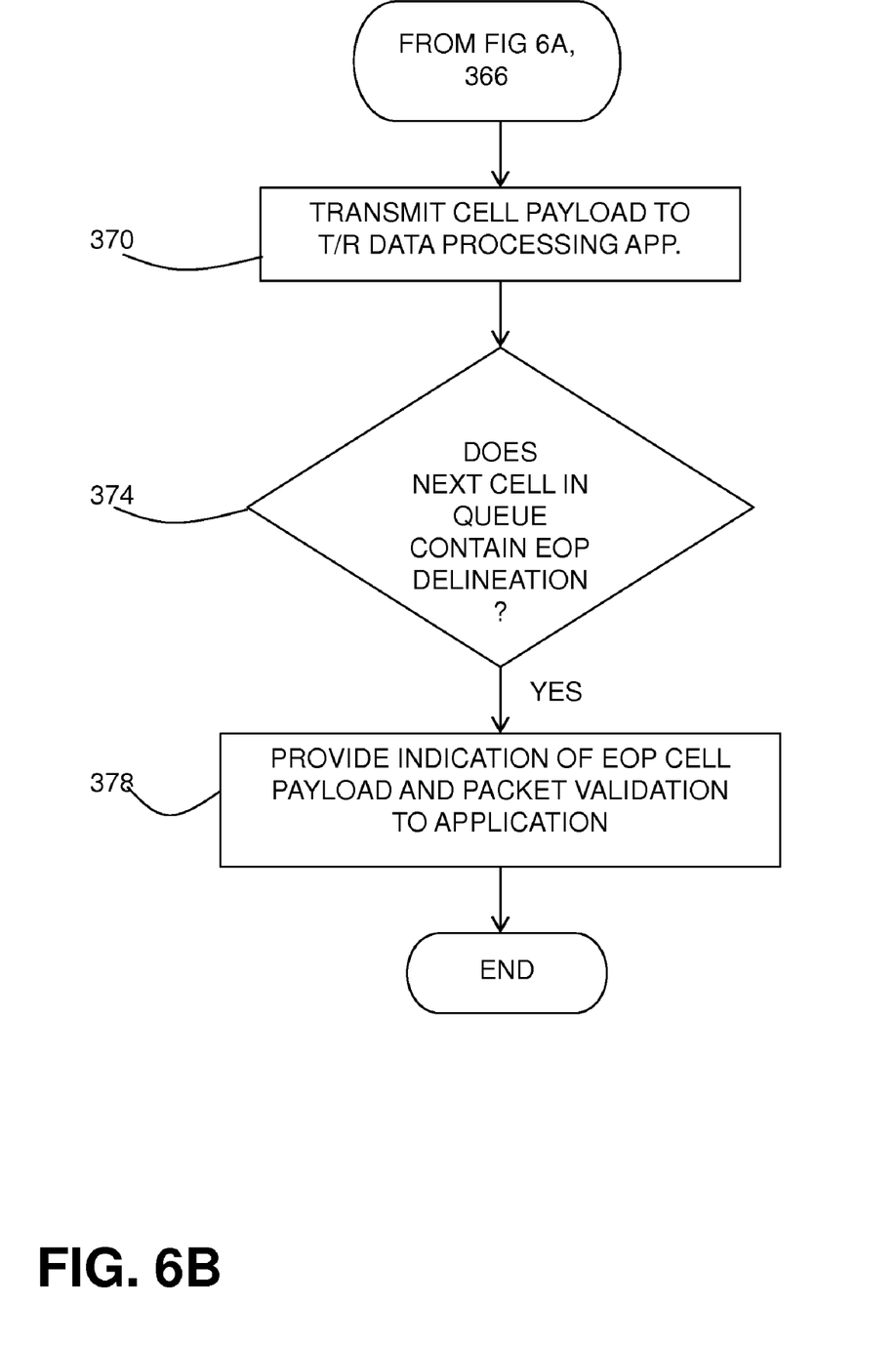

As discussed above, the streaming SAR function 254 streams data between the application and transmission convergence. With reference now to FIG. 6, a flow chart diagram illustrating the operational steps for a downstream flow path where data is received at the transmission convergence function and provided to the streaming SAR and to the application. The embodiment described with respect to FIG. 6 corresponds to the elements of FIG. 4, namely, an application, streaming SAR function, and a transmission convergence function. However, it will be understood that data may be provided from a streaming SAR function to any of a number of applications such as video codecs, data optimization functions, data compression functions, etc. Initially, as indicated at block 350, cells are received at the transmission convergence function from the ATM network. The transmission convergence function transmits the received cells to the AAL SAR function as noted at block 354. The cells are then placed in a received packet queue at the SAR function, according to block 358. The SAR function determines if the SOP indicator is present in the cell at the front of the received packet queue. When the SOP indicator is present in the cell at the front of the received packet queue, the SAR function provides an indication of SOP to the application, as noted at block 366. The SAR function then transmits the cell payload to the application, as indicated at block 370. At block 374, it is then determined if the next cell in the received packet queue contains an EOP delineation. If the next cell in the received packet queue does not contain an EOP delineation, the operations at block 370 are performed. If the next cell in the received packet queue does contain an EOP delineation, the SAR function provides an indication of EOP to the application, along with the cell payload and the packet validation indicator. In this manner, ATM cells received at the transmission convergence function are provided to the application in a streaming fashion, thereby reducing the latency that results from receiving both the SOP and EOP at the SAR function prior to providing the payload data to the application.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. If implemented in a software module, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for transmitting data over an asynchronous transfer mode network, comprising:
   receiving data at a segmentation and reassembly application, the data received as part of a data stream having a start of packet indicator and an end of packet indicator;
   placing information from the data stream into a plurality of ATM cells, wherein the information is placed into a first ATM cell before the end of packet indicator is received at the segmentation and reassembly application;
   transmitting the plurality of the ATM cells, the first ATM cell transmitted from the segmentation and reassembly application before end of packet indicator is received at the segmentation and reassembly application; and
   when the end of packet indicator is received, setting payload type indicator bits in a final ATM cell header and appending a trailer to a final ATM cell.

2. The method of claim 1, wherein the segmentation and reassembly application receives the data stream from a transmit data processing function.

3. The method of claim 1, wherein the segmentation and reassembly application is an ATM Adaptation Layer Type 5 segmentation and reassembly application.

4. The method of claim 1, wherein said transmitting comprises transmitting the ATM cells to a transmission convergence function.

5. The method of claim 4, wherein the steps of processing data by the segmentation and reassembly application are performed by an Field Programmable Gate Array (FPGA).

6. The method of claim 1, wherein each ATM cell comprises up to 48 bytes in an ATM cell payload.

7. The method of claim 6, wherein the final ATM cell includes an 8 octet trailer.

8. A method for receiving data from an asynchronous transfer mode network, comprising:
   receiving a plurality of cells at a transmission convergence application and sending them to a segmentation and reassembly application, the cells received as part of a packet cell stream having a start-of-packet indicator and an end-of-packet indicator;
   the segmentation and reassembly application placing the cells into a receive cell queue, detecting the start-of-packet indicator in one of the cells in the receive cell queue and sending an indication of start of packet to a receive data processing application;
   the segmentation and reassembly application transmitting the cells to the receive data processing application, a first cell transmitted to the receive data processing application from the segmentation and reassembly application before the end-of-packet indicator is received at the segmentation and reassembly application; and
   when the segmentation and reassembly application receives the end-of-packet indicator, providing an indication of end of packet to the receive data processing application and providing an 8-byte trailer to the receive data processing application for packet transmit validation.

9. A method for receiving data from an asynchronous transfer mode network, comprising:
   receiving a plurality of cells at a transmission convergence application and sending them to a segmentation and reassembly application, the cells received as part of a data stream having a start-of-packet indicator and an end-of-packet indicator;
   the segmentation and reassembly application placing the received cells into a receive cell queue, detecting a start-of-packet indicator in one of the cells in the queue and sending the indicator to a receive data processing application, wherein the receive data processing application comprises an optimization decoder;
   the segmentation and reassembly application transmitting the cells to the receive data processing application, the first cell transmitted to the receive data processing application from the segmentation and reassembly application before the end-of-packet indicator is received at the segmentation and reassembly application; and when the segmentation and reassembly application receives an indication that the final cell of the ATM cells is received, providing an end-of-packet indication to the receive data processing application and providing an 8-byte trailer to the receive data processing application for packet transmit validation.

10. The method of claim 8, further comprising:
receiving cells from the received cell queue at a segmentation and reassembly application; and
assembling a plurality of the cells from the received cell queue into a packet cell stream to be provided to the receive data processing application.

11. The method of claim 10, wherein said segmentation and reassembly application is operable to perform segmentation and reassembly based on ATM Adaptation Layer Type 5 ATM cells.

12. The method of claim 11, wherein said transmission convergence, segmentation and reassembly, and receive data processing application steps are performed by an Field Programmable Gate Array (FPGA).

13. The method of claim 8, wherein each cell placed into the received cell queue comprises a 48-byte payload.

14. The method of claim 13, wherein a final cell includes a payload type indicator bit which is set to indicate that the cell is the final cell in the packet cell stream, and the final cell includes a 8 octet trailer.

15. An ATM network endpoint, comprising:
a memory device;
a processing device; and
an ATM network interface device comprising a transmit data processing module that operates to prepare a packet of data for transmission across the ATM network, an ATM segmentation and reassembly module that operates to divide the packet of data into a plurality of ATM cells to form a packet cell stream, and a transmission convergence module;
the segmentation and reassembly module providing a portion of the packet of data into a first ATM cell before receiving an end-of-packet indicator for the packet of data, and providing the first ATM cell to the transmission convergence module before receiving the end-of-packet indicator for the packet of data.

16. The ATM network interface of claim 15, wherein the transmit data processing module is comprised of one or both of a codec application and a data compression application.

17. The ATM network interface of claim 15, wherein the transmission convergence module operates to convert data formatted for use by the ATM network interface into data for use by the ATM network.

18. An ATM endpoint, comprising:
a memory device;
a processing device, and
an ATM network interface device comprising:
a transmission convergence module for receiving ATM cells;
a receive data processing application that operates to receive a packet of data transmitted across an ATM network; and
a segmentation and reassembly module for reassembling a packet of data from a packet cell stream that includes a start-of-packet indicator for the packet cell stream and an end-of-packet indicator for the packet cell stream, the segmentation and reassembly module providing a first ATM cell to the receive data processing application before it receives the end-of-packet indicator for the packet cell stream.

19. The ATM network interface of claim 18, wherein the receive data processing module is comprised of one or both of a codec application and a data compression application.

20. The ATM network interface of claim 18, wherein the transmission convergence module operates to convert ATM network formatted data into a format that can be used by the ATM network interface.

* * * * *